O. MESSTER.
APPARATUS FOR THE PRODUCTION OF CINEMATOGRAPHIC PICTURE SERIES.
APPLICATION FILED JUNE 26, 1920.
1,432,405.
Patented Oct. 17, 1922.
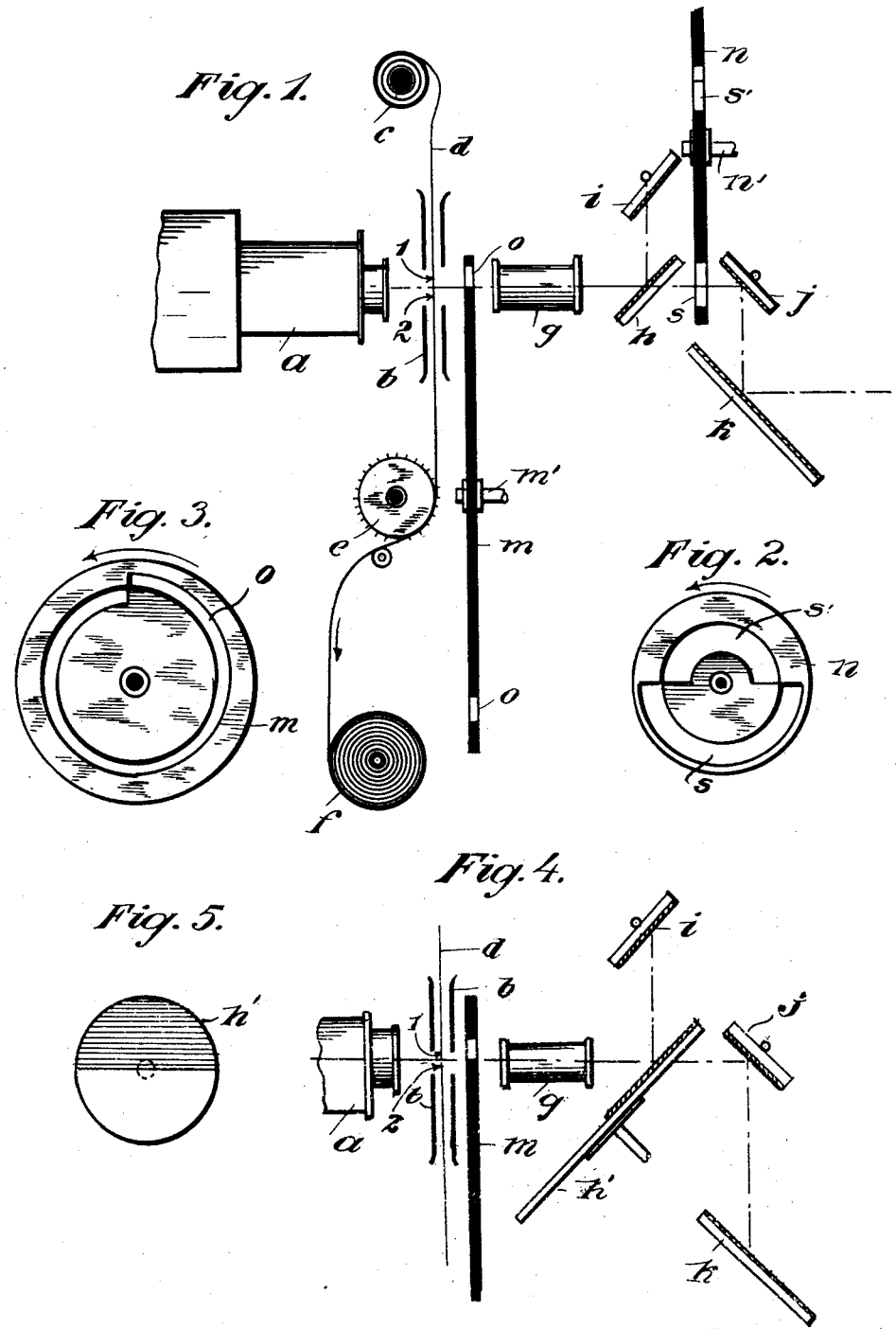
Inventor
Oskar Messter
By William Clinton
Attorney

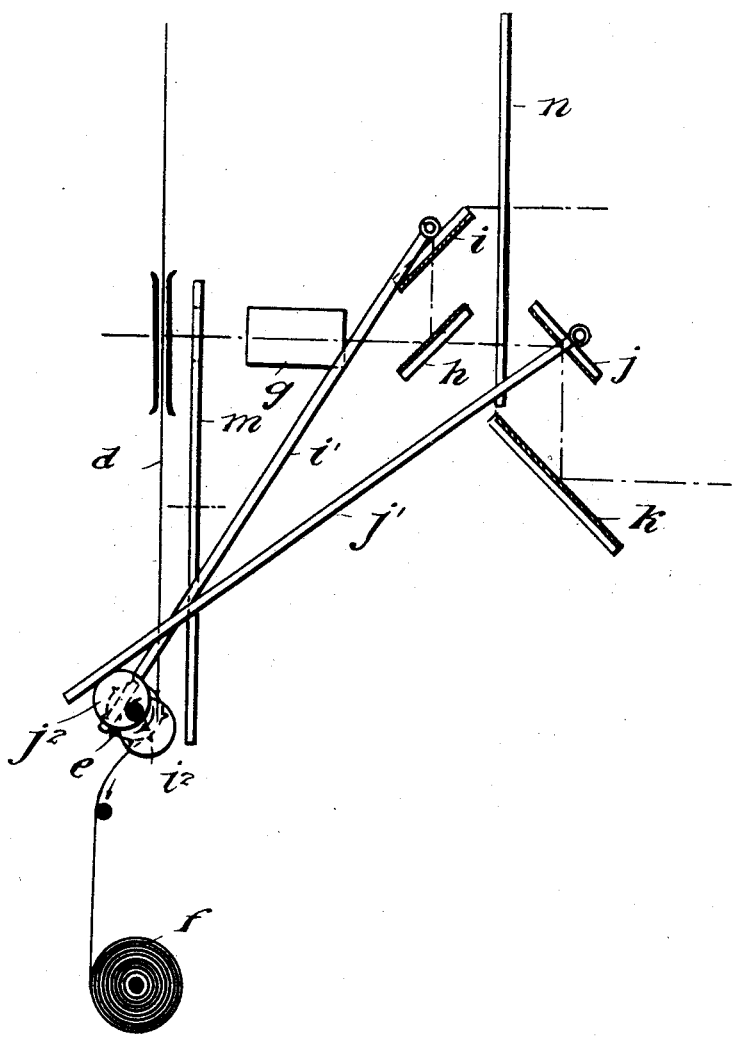

Patented Oct. 17, 1922.

1,432,405

UNITED STATES PATENT OFFICE.

OSKAR MESSTER, OF BERLIN, GERMANY.

APPARATUS FOR THE PRODUCTION OF CINEMATOGRAPHIC PICTURE SERIES.

Application filed June 26, 1920. Serial No. 392,076.

(GRANTED UNDER THE PROVISIONS OF THE ACT OF MARCH 3, 1921, 41 STAT. L., 1313.)

*To all whom it may concern:*

Be it known that I, OSKAR MESSTER, manufacturer, a citizen of the German Republic, residing at Nos. 110–111 Leipzigerstrasse, Berlin, Germany, have invented certain new and useful Improvements in Apparatus for the Production of Cinematographic Picture Series (for which I have filed applications in Germany March 20, 1918, and August 11, 1919), of which the following is a specification.

This invention relates to an apparatus for the production of cinematographic series of pictures in which a continuously running film is employed and an optical compensation takes place. With apparatus of this kind it is already known to make use of, for the purpose of producing the optical compensation, of an intermittently rotatable ring or circle of mirrors or prisms, the individual reflecting surfaces of which project each an individual picture, the mirrors or prisms being stationary during such projection and the individual pictures following each other in conformity with the individual reflecting surfaces. The disadvantages of that known apparatus as brought about by the great number of the compensating elements renders that apparatus unsuited for practical application.

It is also known to effect the optical compensation for an individual picture by aid of one or more compensating means, such as oscillating or otherwise moving mirrors, prisms or lenses, by actuating the reflecting surface of the respective compensating means in such a manner that it jerks back after each reflection of an individual picture into its initial position, there arising upon the screen during the time of this return-movement a dark interval whereby the so-called flicker is produced; then the next individual picture is made with aid of the respective compensating means, and so on.

It is, furthermore, known, where reflecting surfaces are employed, to project the individual picture in the manner just mentioned, and then, during the return-movement of the reflecting surface used, to project the next individual picture by means of another reflecting surface, may be a mirror, prism or the like. This entails, however, the necessity that the respective reflecting means, although moving only through a comparatively short way during the reflexion, as far as this is utilized, must cover a comparatively long way in order to return into their initial position, because otherwise their non-acting parts collide with the acting ones during this latter motion.

Now, the gist of the present invention resides in this that a special optical system is arranged between the film-picture and the movable optical compensation means, the arrangement being such that the pictures are conducted by that optical system alternately to the one and to the other optical compensating means. Such means, i. e. intermediate means, may consist, for instance, of a mirror or prism, the surface of which has stripes of silver, silver-plating, or the like, and which is arranged in the path of the ways, in front of the object-glass and inclined with respect to the same. That mirror or lens co-operates with deflecting mirrors and covering disks, as is more fully described hereinafter. Or, instead of the mirror or lens just mentioned, which is stationary, a movable mirror, for instance a rotating mirror, segment may be employed for deflecting the individual pictures to an optical compensating means, for instance such as reflecting mirrors, as well as for permitting the individual pictures to pass freely through the movable mirror.

This arrangement allows of the employment of only two systems of mirrors, prisms, or lenses, which are movable, for instance oscillating, in such a manner that whilst one of the two systems is employed for the projection, the other returns into its initial position upon the same way which it has previously covered, i. e. upon the shortest way. If, thus, for instance, oscillating compensating means are employed and one individual picture is shown by the one of the two systems in 1/25 of a second, then the other of the two systems receives the other individual picture whilst the first system returns during that time into its initial position.

Thus, the optical compensating means need cover only that way which is required during their action; their jerking back may now be dispensed with and the disturbing shocks thereby produced are overcome.

In order to make my invention more clear, I refer to the accompanying drawing, in which similar letters of reference denote similar parts throughout the several views, and in which:

Figure 1 is a diagrammatical representation of a combination and arrangement of parts constituting in their entirety a device according to my invention;

Figure 2 is a front view of a rotary disk ($n$) forming one of said parts, this disk being drawn on a smaller scale than in Figure 1;

Figure 3 is a similar representation showing another disk ($m$) also drawn on a smaller scale than in Figure 1;

Figure 4 shows a slightly changed combination and arrangement of parts constituting a slightly modified form of construction of the device in question;

Figure 5 is a front view of one of the parts, viz. of a rotating mirror, or mirror-segment respectively ($h'$); and Figure 6 shows an additional combination and arrangement of parts intended to be employed in connection with that shown in Figure 1, or in connection with that shown in Figure 4.

Referring to Figures 1-3, $a$ is a lamp box and $b$ a guide channel arranged in known manner before that box. The film band $d$ is pulled by the cogged drum $e$ through said channel; it is drawn off the roll $c$, wound upon the roll $f$, and provided with individual pictures, such as indicated by the numerals 1 and 2 in front of the box $a$. $g$ is the object glass; $h$ is a flat glass plate having parallel surfaces, of which one is provided with stripes of a layer of silver which deflect a part of the rays from the object glass to the movable mirror $i$ and let the other rays pass through between the silver stripes to the mirror $j$ which is also movable. $k$ is a stationary mirror which receives the rays of the mirror $j$ and deflects them to and upon the screen (not shown). $n$ is a rotary disk which is secured to the shaft $n'$ and turned by it; it has two semi-circular slots $s$ $s'$, of which $s$ has a larger diameter than $s'$. In the position of the parts as shown in Figure 1, the slot $s$ lies between the glass plate $h$ and the mirror $j$ and the rays can pass from $h$ to $j$ as indicated by a dotted line, whereas the path from the mirror immediately to the screen is blocked up by the solid middle part of the disk $n$, between the slots $s$ and $s'$.

$m$ is a disk, which is secured to a shaft $m'$ and is provided with a spiral-shaped slot $o$. The disk $m$ is rotated by the shaft $m'$, and the size and shape of the slot $o$ is such that one end of it lies just above the axial connecting line of the lamp glass and the object glass, i. e. opposite to the individual picture 1 (Figure 1), whereas the other end of said slot, after a further rotation of a few degrees of the disk, lies just below said axial line, i. e. opposite to the individual picture 2 (Figure 1), and the disk performs one rotation whilst the picture moves from the place 1 to the place 2, the picture remaining thus always opposite to the slot, but the distance from the shaft $m'$ varying as the film band moves forward with the appropriate speed.

The operation of the whole is as follows:

In the position of the parts as shown in Figure 1, the outer end of the slot $o$ of the rotary disk $m$ is just opposite to the individual picture 1, and the outer slot $s$ of the disk $n$ lies between the glass plate $h$ and the mirror $j$. The rays coming forth from the object glass $g$ are divided, one part being deflected by the silver stripes of the glass $h$ to the mirror $i$, the other part passing through the interstices between said stripes, and through the slot $s$, to the mirror $j$ which deflects them to the mirror $k$ which deflects them further to the screen. The rays getting to the mirror $i$ and being deflected by it are blocked up by the solid part of the disk $n$. The disk $n$ makes one half rotation whilst the disk $m$ makes one complete rotation. Also the mirrors $i$ and $j$ perform certain movements whilst being engaged in deflecting or projecting the rays, that is to say, they oscillate through an appropriately small angle, in such a manner, that the rays which they deflect to, and project upon, the screen appear to be stationary upon this latter. The mirror $i$ swings back into its initial position whilst the mirror $j$ is engaged, and this mirror swings back into its initial position whilst the mirror $i$ is engaged, the change of position taking place whilst the rays are blocked up by the inner or the outer solid part of the disk $n$, according to the position of this latter.

The mirror $h$ may be dispensed with and replaced by a rotary disc $h'$ as is illustrated in Figures 4 and 5. One-half of this disc $h'$ is provided with reflectors or silver stripes which are so spaced apart as to provide transparent stripes therebetween. When this half of the disc comes within the path of travel of the rays, a portion thereof will be deflected by the silver stripes to the mirror $i$, whereas the remaining rays will pass through the transparent portions of the disc to the mirror $j$. From this, it is evident that the rays of lights will be so divided that a portion thereof will be deflected by the mirror $i$ and the remaining portion will be deflected by the mirror $k$, but these divided rays of lights will consequently meet upon the screen. This disc $h'$ acts as a shutter for the projecting mechanism, as the half thereof, which is blank, does not deflect any of the rays of light nor can the latter pass therethrough.

To oscillate the swinging mirrors $i$ and $j$ the arrangement shown in Figure 6 may be employed. The mirrors are firmly connected with bars $i'$ $j'$, the free ends of which are acted on by cam disks $i^2$ $j^2$ affixed to the shaft of the cogged drum $e$ (Figures 1 and 6). The bars are obviously oscillated by the cam disks and they, in their turn, oscillate the mirrors, the extent of the oscillation being just that required for the proper operation of the parts shown in Figure 1 and in Figure 4. The circumference of the drum $e$ corresponds to the combined lengths of two consecutive individual pictures, and each mirror swings one time to and fro during one complete rotation of said drum.

There is in the device shown in Figure 6 no dead play, as is the case where cog-wheels are employed as transmission parts. That drawback is thus overcome, and an exact gear of the compensation elements is guaranteed.

Having now described my invention, what I desire to secure by a patent of the United States is:

1. An apparatus for the production of cinematographic picture-series, comprising, in combination, means for continuously moving a film-band; an object-glass; a rotary disk arranged between the film-band and the object-glass; a spiral-shaped slot in said disk; a reflecting-plate arranged in oblique position in front of the object-glass; stripes of a reflecting material upon said plate; an oblique mirror arranged laterally from the glass-plate; another oblique mirror arranged in front of the said glass-plate; and an auxiliary mirror arranged laterally from said last-mentioned mirror.

2. An apparatus for the production of cinematographic picture-series, comprising, in combination, means for continuously moving a film-band; a lamp box; an object-glass; a film-band guide arranged between said lamp box and said object-glass; a rotary disk arranged between said film-band guide and the said object-glass; a spiral-shaped slot in said disk, said slot extending round the said disk; a reflecting plate arranged in front of the object-glass; stripes of silver upon said plate; an oscillating mirror opposite to the said plate; another oscillating mirror laterally from the plate, a stationary mirror laterally from the first-mentioned mirror; a rotary disk arranged beween the first and the second mirror; and two semi-circular slots in said second rotary plate, as set forth.

3. An apparatus for the production of cinematographic picture-series, comprising, in combination, means for continuously moving a film-band; an object-glass; a rotary disk arranged between the film-band and the object-glass; a spiral-shaped slot in said disk; a reflecting-plate arranged in oblique position in front of the object-glass; stripes of a reflecting material upon said plate; an oblique mirror arranged laterally from the glass-plate; another oblique mirror arranged in front of the said glass-plate; a stationary mirror arranged laterally from said last-mentioned mirror; another rotary disk so arranged as to have its rim lie between the said glass-plate and the second mirror; two semi-circular slots in said other disk; and means to rotate said two disks with such a speed that the said second disk makes one-half rotation whilst the said first disk makes a complete rotation, for the purpose set forth.

4. An apparatus for the production of cinematographic picture-series, comprising, in combination, means for continuously moving a film-band; an object-glass; a rotary disk arranged between the film-band and th. object-glass; a spiral-shaped slot in said disk; a stationary reflecting glass plate arranged in oblique position in front of the object-glass; stripes of a reflecting material upon said plate; an oscillating oblique mirror arranged over the glass-plate; another oscillating oblique mirror arranged in front of the said glass-plate; a stationary mirror arranged below said second mirror; and means to oscillate the first and the second mirror in such a manner that the one moves from its position of rest into its working position whilst the other moves from its working position into its position of rest, and reversely, for the purpose set forth.

5. An apparatus for the production of cinematographic picture-series, comprising, in combination, means for continuously moving a film-band; an object-glass; a rotary disk arranged between the film-band and the object-glass; a spiral-shaped slot in said disk; a stationary reflecting glass plate arranged in oblique position in front of the object-glass; stripes of a reflecting material upon said plate; an oscillating oblique mirror arranged over the glass-plate; another oscillating oblique mirror arranged in front of the said glass-plate; a stationary mirror arranged below said second mirror; rods attached to the first and the second mirror; cam-disks for oscillating said rods; and means for rotating said cam-disks, for the purpose as described.

In testimony whereof I affix my signature.

OSKAR MESSTER.